United States Patent
Hsiao

(10) Patent No.: US 10,125,885 B2
(45) Date of Patent: Nov. 13, 2018

(54) CHECK VALVE MOUNTING STRUCTURE

(71) Applicant: HOLIMAY CORPORATION, Bade, Taoyuan County (TW)

(72) Inventor: Yu-Ming Hsiao, Bade (TW)

(73) Assignee: Holimay Corporation, Bade, Taoyuan County (TW)

( * ) Notice: Subject to any disclaimer, the term of this patent is extended or adjusted under 35 U.S.C. 154(b) by 36 days.

(21) Appl. No.: 15/610,940

(22) Filed: Jun. 1, 2017

(65) Prior Publication Data

US 2017/0350523 A1 Dec. 7, 2017

(30) Foreign Application Priority Data

Jun. 3, 2016 (TW) .............................. 105117546 A

(51) Int. Cl.
  *F16K 27/02* (2006.01)
  *F16L 37/248* (2006.01)
  *F16K 15/04* (2006.01)
  *H02K 5/04* (2006.01)

(52) U.S. Cl.
  CPC .......... *F16K 27/0209* (2013.01); *F16K 15/04* (2013.01); *F16L 37/248* (2013.01); *H02K 5/04* (2013.01); *Y10T 137/6086* (2015.04)

(58) Field of Classification Search
  CPC .... F16K 27/0209; F16K 15/04; F16L 37/248; H02K 5/04; Y10T 137/6086
  See application file for complete search history.

(56) References Cited

U.S. PATENT DOCUMENTS

| 6,322,326 B1* | 11/2001 | Davis | F04D 13/08 417/279 |
|---|---|---|---|
| 7,252,482 B2* | 8/2007 | Walker | F04D 13/06 310/63 |
| 2006/0185739 A1* | 8/2006 | Niki | F16L 37/40 137/543.23 |
| 2009/0183779 A1* | 7/2009 | Minard | F16K 15/147 137/14 |
| 2010/0170857 A1* | 7/2010 | Williams | B01D 35/147 210/741 |

(Continued)

FOREIGN PATENT DOCUMENTS

TW    M391600 U    11/2010

*Primary Examiner* — Craig Schneider
*Assistant Examiner* — Kevin Barss
(74) *Attorney, Agent, or Firm* — Muncy, Geissler, Olds & Lowe, P.C.

(57) ABSTRACT

A check valve mounting structure includes a seat plate including a mounting hole and linked notches, a tubular bottom fitting with the top end thereof aimed at the mounting hole and having lugs extended from the periphery, and a holder block including a top receptacle, a shoulder and a bottom receptacle, which includes protruding portions outwardly extended from the periphery, first channels upwardly extended from the bottom side to a predetermined distance and second channels respectively and horizontally extended from the top ends of the first channels toward the periphery thereof. The bottom receptacle is attached onto the tubular bottom fitting, allowing the protruding portions to pass through the notches. The lugs are respectively inserted into the first channels and the second channels.

9 Claims, 7 Drawing Sheets

(56) References Cited

U.S. PATENT DOCUMENTS

| | | | | |
|---|---|---|---|---|
| 2011/0174714 A1* | 7/2011 | Hsiao | .................... | F24F 13/222 |
| | | | | 210/236 |
| 2015/0275919 A1* | 10/2015 | Hsiao | .................... | F04D 29/582 |
| | | | | 415/115 |
| 2015/0276300 A1* | 10/2015 | Hsiao | .................... | F04D 29/428 |
| | | | | 62/426 |
| 2017/0051835 A1* | 2/2017 | Williams | ................ | F16B 21/04 |
| 2017/0350415 A1* | 12/2017 | Hsiao | ................. | F04D 29/4246 |

* cited by examiner

CHECK VALVE MOUNTING STRUCTURE

BACKGROUND OF THE INVENTION

1. Field of the Invention

The present invention relates to check valve mounting technology and more particularly, to a check valve mounting structure.

2. Description of the Related Art

Taiwan patent M391600 discloses a check valve mounting design. It can be known from the annexed drawing of this patent, the check valve is mounted in a drainage joint set 20. The drainage joint set achieves fixation (see FIG. 1 of the specification) by means of a thread-connection, or the use of a retaining groove and a snap-in plate 60 (see FIG. 3 of the specification).

However, according to the aforesaid prior art design, the thread connection can be loosened when rotated in the reversed direction by an external force, causing falling or displacement of the check valve. The use of a retaining groove and a snap-in plate can easily be forced to fall off upon an impact and cannot pass a drop test.

SUMMARY OF THE INVENTION

The present invention has been accomplished under the circumstances in view. It is the main object of the present invention to provide a check valve mounting structure, which achieves a good fixation effect, avoiding accidental disconnection. To achieve this and other objects of the present invention, a check valve mounting structure comprises a seat plate, a tubular bottom fitting and a holder block. The seat plate comprises a mounting hole and at least one notch outwardly extended from the border area of the mounting hole in an intercommunication manner. The tubular bottom fitting is mounted in the seat plate at a bottom side with a top end thereof aimed at the mounting hole. The tubular bottom fitting comprises at least one lug outwardly extended from the periphery thereof. The holder block comprises a top receptacle, a shoulder extended around the top receptacle and a bottom receptacle downwardly extended from the shoulder. The top receptacle and the bottom receptacle are disposed in communication with each other. The top receptacle comprises a through hole axially extended on the center. The caliber of the bottom receptacle is larger than the top receptacle. The shoulder defines a pressing surface on a bottom side thereof within the coverage of the bottom receptacle. The bottom receptacle comprises at least one protruding portion outwardly extended from the periphery thereof, at least one first channel upwardly extended from a bottom side thereof to a predetermined distance, and at least one second channel respectively and horizontally extended from a top end of one respective first channel toward the periphery thereof. The bottom receptacle is downwardly inserted through the mounting hole and attached onto the tubular bottom fitting, allowing the at least one protruding portion to pass through the at least one notch. The at least one lug is respectively inserted into the at least one first channel. After insertion of the at least one lug into the at least one first channel, the holder block is rotated through a predetermined angle to move the at least one lug into the at least one second channel and to shift the at least one protruding portion partially to a bottom surface of the seat plate. Subject to the arrangement that the at least one protruding portion is partially abutted at the bottom side of the seat plate to prohibit the holder block from upward displacement. Further, by means of shifting the at least one lug from the at least one first channel to the at least one second channel, the holder block is locked to the tubular bottom fitting. Since the tubular bottom fitting is mounted in the seat plate, the holder block is engaged with the seat plate and the tubular bottom fitting to achieve a double engagement relationship, and thus, the holder block is firmly secured to the tubular bottom fitting and the seat plate. Thus, a good fixation effect is achieved.

Other advantages and features of the present invention will be fully understood by reference to the following specification in conjunction with the accompanying drawings, in which like reference signs denote like components of structure.

DETAILED DESCRIPTION OF THE INVENTION

Figure 1:
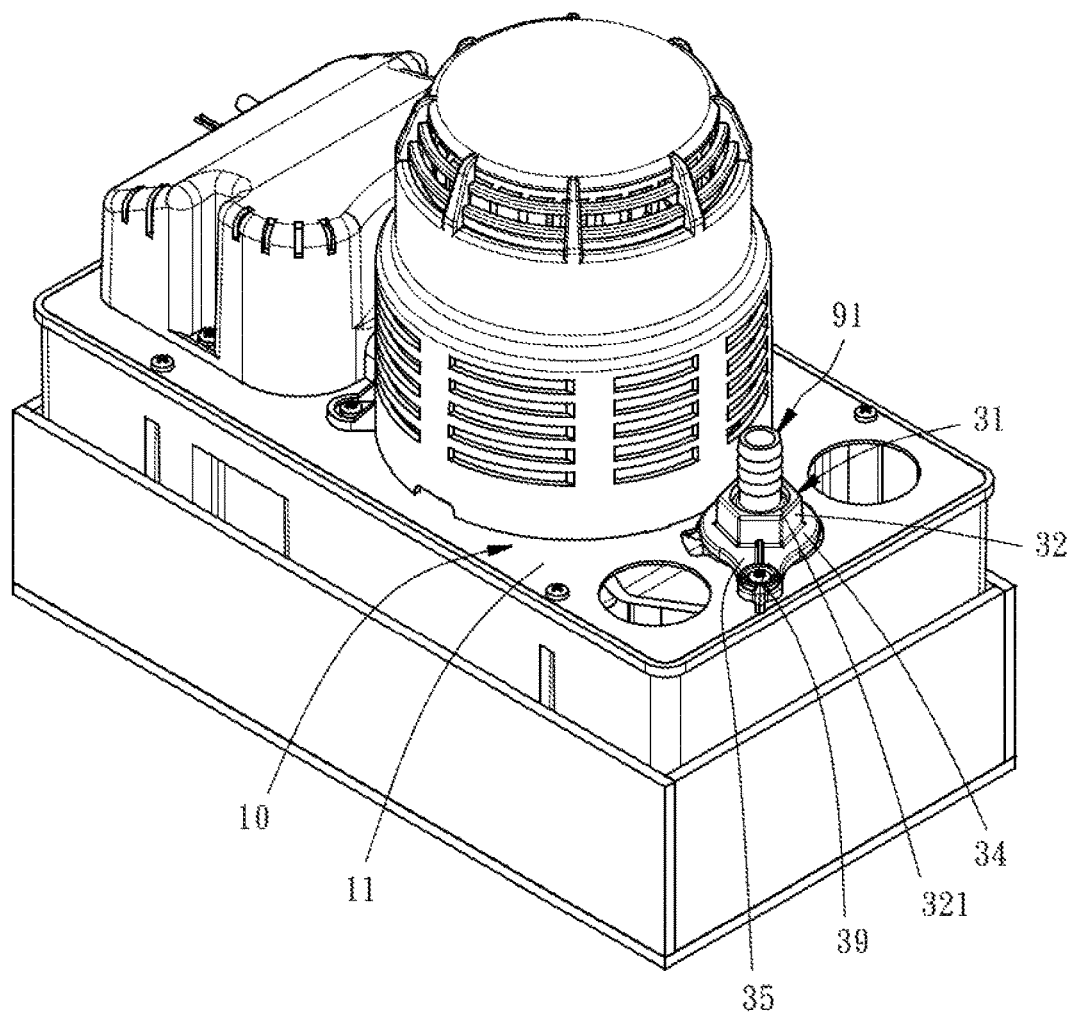
FIG. 1 is an oblique top elevational view illustrating a check valve mounting structure installed in a drainage device in accordance with a preferred embodiment of the present invention.
Figure 2:
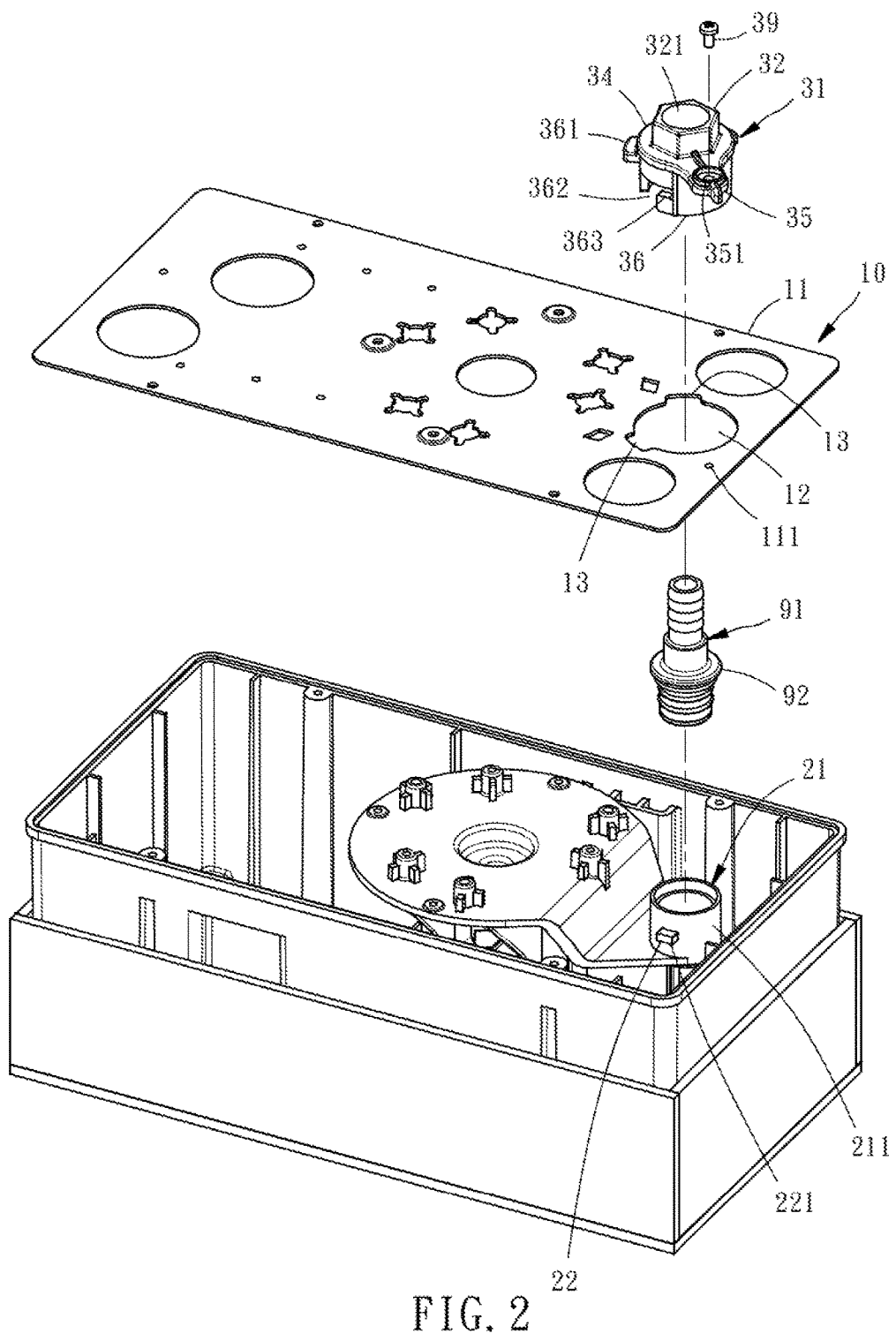
FIG. 2 is an exploded view of the preferred embodiment of the present invention.

Referring to FIGS. 1-7, a check valve mounting structure 10 in accordance with the present invention is shown. As illustrated, the check valve mounting structure 10 comprises a seat plate 11, a tubular bottom fitting 21 and a holder block 31.

The seat plate 11 comprises a mounting hole 12, and at least one notch 13 outwardly extended from the border area of the mounting hole 12 in an intercommunication manner.

The tubular bottom fitting 21 is mounted in the seat plate 11 at the bottom side, having a top end thereof aimed at the mounting hole 12. Further, the tubular bottom fitting 21 comprises at least one lug 22 outwardly extended from the periphery thereof.

The holder block 31 comprises a top receptacle 32, a shoulder 34 extended around the top receptacle 32, and a bottom receptacle 36 downwardly extended from the shoulder 34. The top receptacle 32 and the bottom receptacle 36 are disposed in communication with each other. The top receptacle 32 comprises a through hole 321 axially extended on the center. The caliber of the bottom receptacle 36 is larger than the top receptacle 32. The shoulder 34 defines a pressing surface 341 on a bottom side thereof within the coverage of the bottom receptacle 36. The bottom receptacle 36 comprises at least one protruding portion 361 outwardly extended from the periphery thereof, at least one first channel 362 upwardly extended from a bottom side thereof to a predetermined distance, and at least one second channel 363 respectively and horizontally extended from a top end of each first channel 362 toward the periphery thereof.

The bottom receptacle 36 is downwardly inserted through the mounting hole 12 and attached onto the tubular bottom fitting 21, allowing the at least one protruding portion 361 to pass through the at least one notch 13. Further, the at least one lug 22 is respectively inserted into the at least one first channel 362. After the at least one lug 22 is respectively inserted into the at least one first channel 362, the holder block 31 is rotated through a predetermined angle, moving the at least one lug 22 into the at least one second channel 363 and shifting the at least one protruding portion 361 partially to a bottom surface of the seat plate 11.

In the present preferred embodiment, the number of the at least one lug 22 is 2; the number of the at least one first channel 362 is 2; the number of the at least one second channel 363 is 2; the number of the at least one notch 13 is 2; the number of the at least one protruding portion 361 is 2; the two first channels 362 and the two second channels 363 cut through the bottom receptacle 36.

Figure 3:
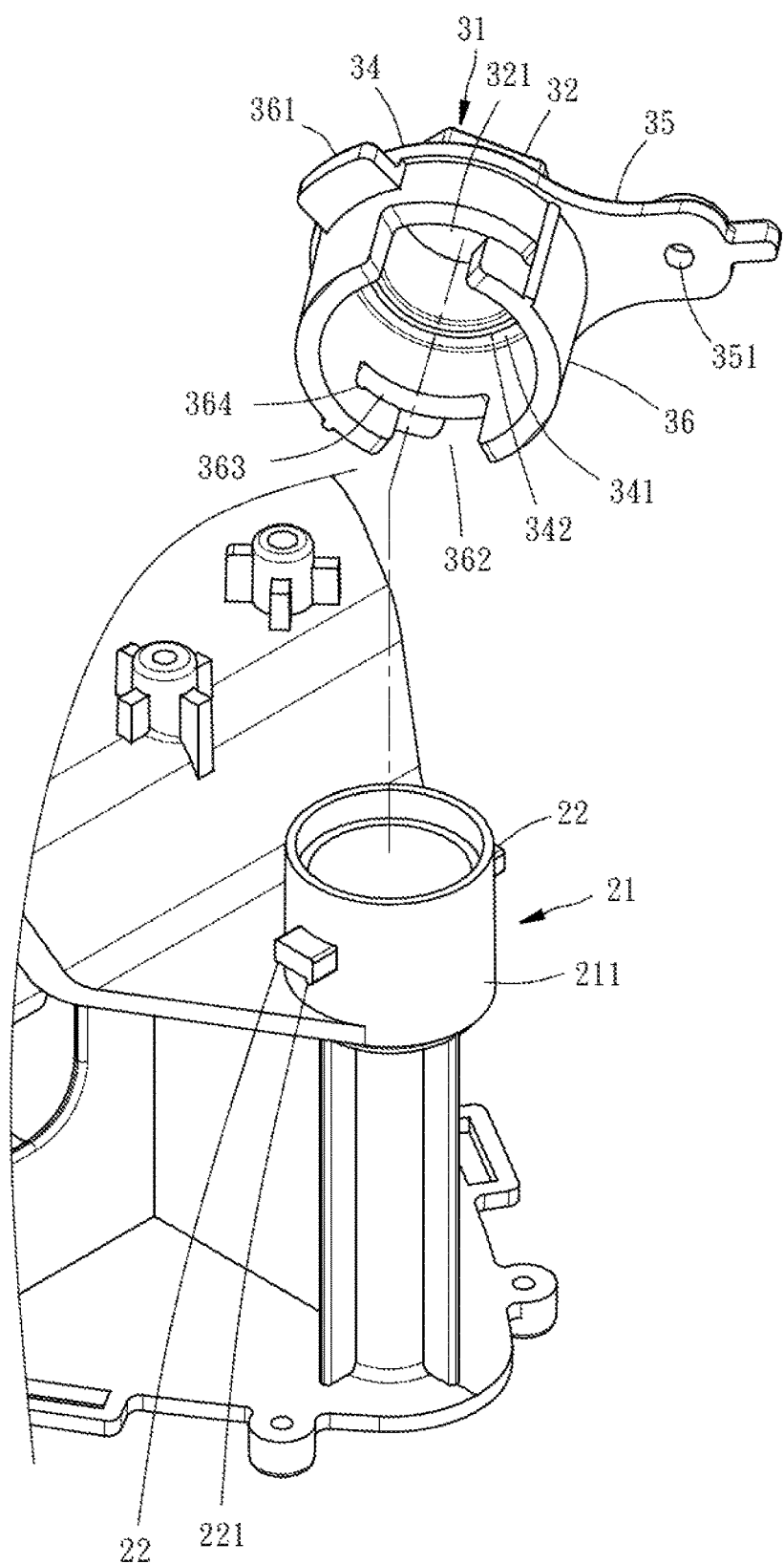
FIG. 3 is an exploded view of a part of the present invention, illustrating the relationship between the holder block and the tubular bottom fitting.
Figure 4:
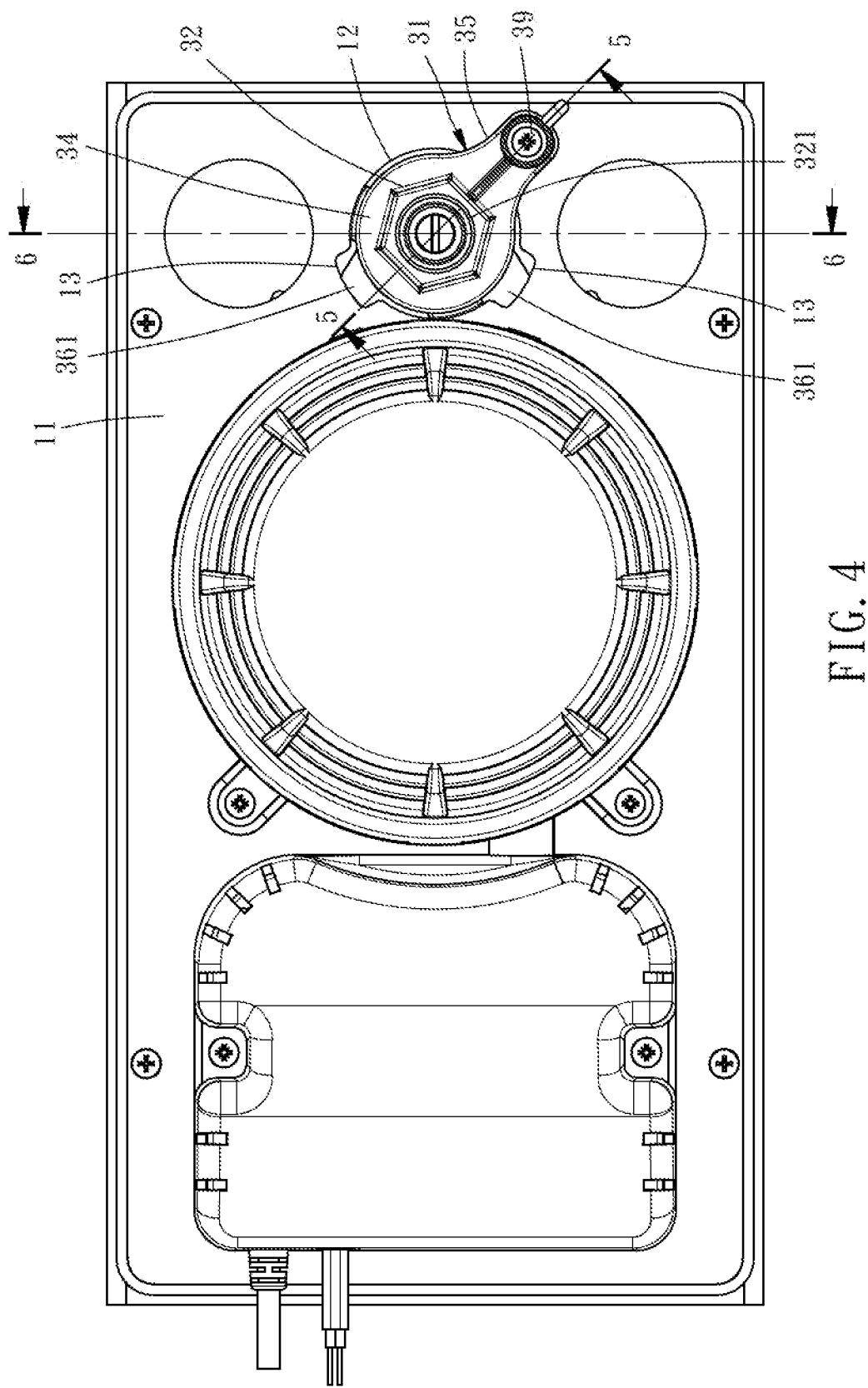
FIG. 4 is a top view of the preferred embodiment of the present invention.
Figure 7:
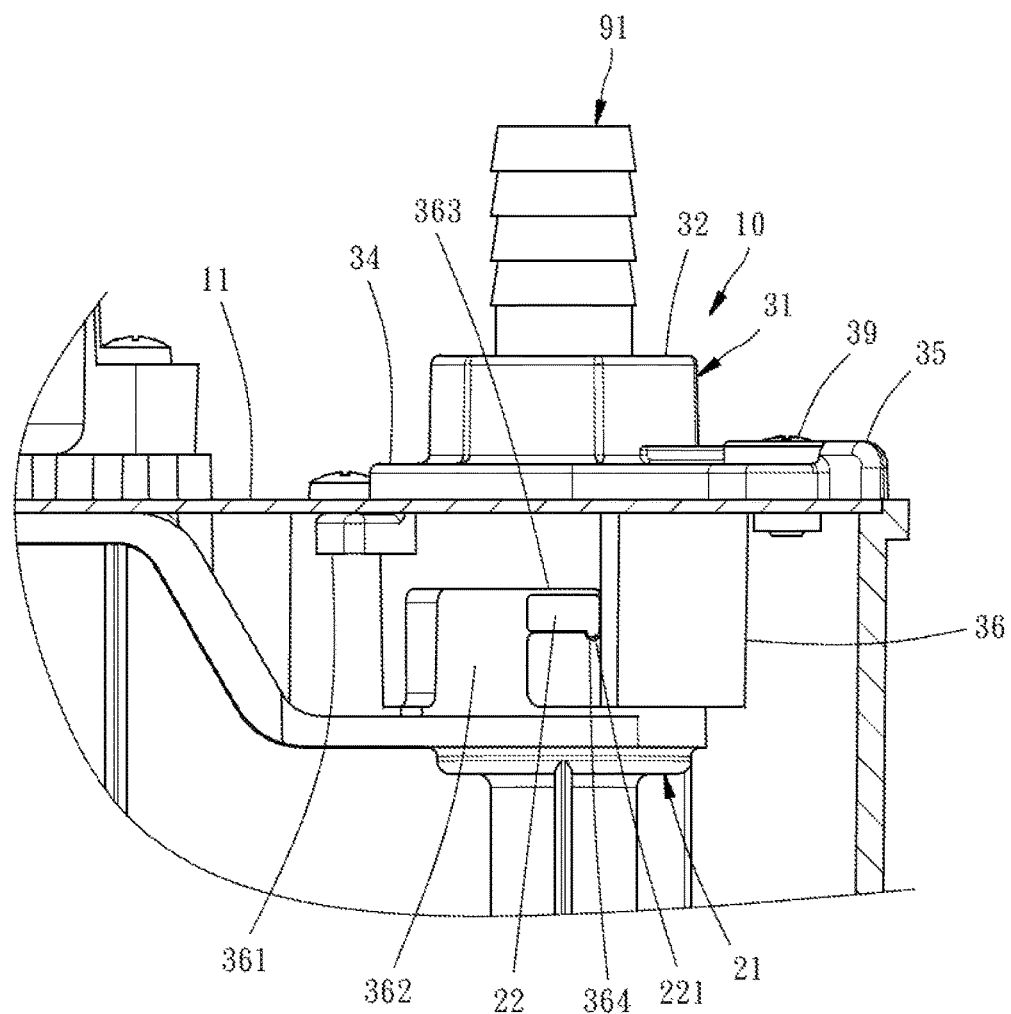
FIG. 7 is a sectional side view of a part of the present invention, illustrating the holder block, the seat plate and the tubular bottom fitting fastened together.

As illustrated in FIGS. 3 and 7, after installation of the check valve mounting structure 10, the holder block 31 is attached onto the tubular bottom fitting 21 and has been rotated through an angle, at this time, the two protruding portions 361 are partially abutted at the bottom surface of the seat plate 11 to prohibit holder block 31 from upward displacement relative to the seat plate 11; the two lugs 22 have also been shifted from the respective first channels 362 to the respective second channels 363 to lock the holder block 31 to the top side of the tubular bottom fitting 21. Since the tubular bottom fitting 21 is mounted in the seat plate 11, the holder block 31 is engaged with the seat plate 11 and the tubular bottom fitting 21 to achieve a double engagement relationship, and thus, the holder block 31 is firmly secured to the tubular bottom fitting 21 and the seat plate 11. Thus, a good fixation effect is achieved. This good fixation effect is the scope of the technical feature of the present invention that can pass a drop test.

It is to be noted that, as shown in FIGS. 1-7, in the above-described embodiment, the holder block 31 further comprises a wing portion 35 horizontally outwardly extended from the shoulder 34, and a locating hole 351 cut through the wing portion 35; the seat plate 11 further comprises a screw hole 111; a screw bolt 39 is inserted through the locating hole 351 and threaded into the screw hole 111 to fixedly fasten the wing portion 35 to the seat plate 11, providing an additional fixation effect to surely prevent the holder block 31 from accidental rotation.

In addition, it may be added that in order to provide a better fixation effect, the bottom receptacle 36 is configured to provide a recess 364 at a distal end off each second channel 363, and each lug 22 is configured to provide a raised portion 221. When the two lugs 22 are respectively moved to the respective second channels 363, the raised portions 221 are respectively forced into engagement with the respective recesses 364, enhancing the fixation effect.

Figure 5:
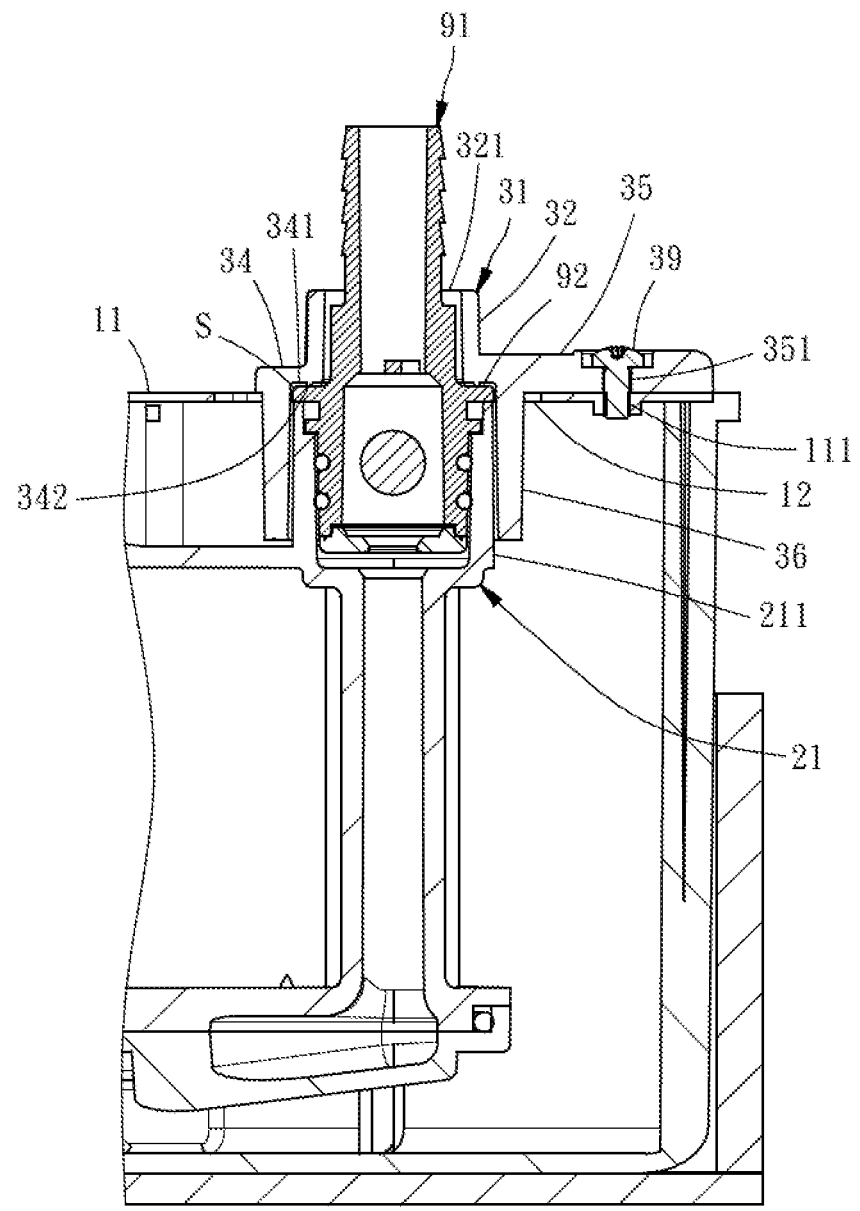
FIG. 5 is a sectional view taken along line 5-5 of FIG. 4.
Figure 6:
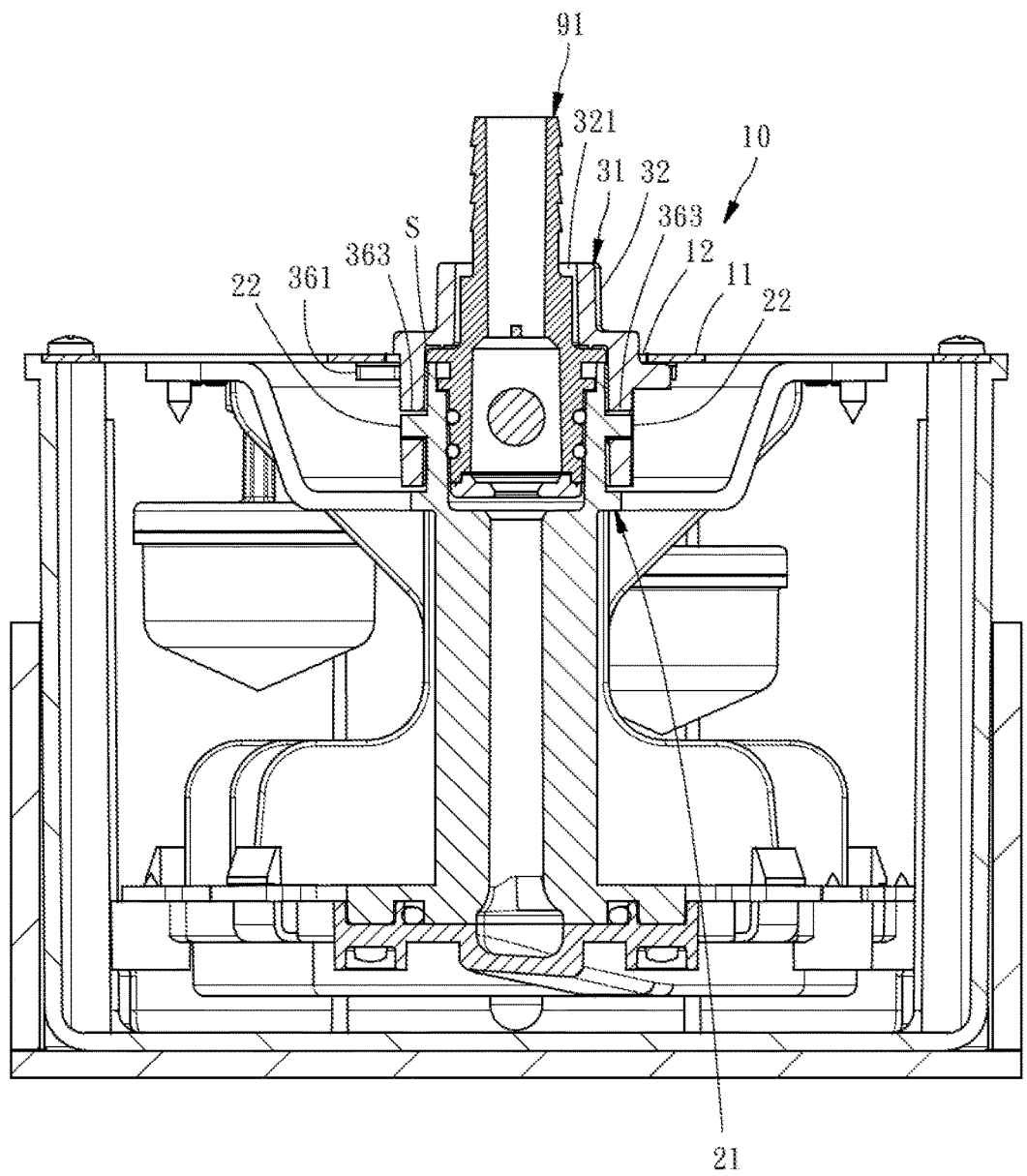
FIG. 6 is a sectional view taken along line 6-6 of FIG. 4.

Further, as illustrated in FIGS. 5 and 6, in order to facilitate the installation of a check valve, the tubular bottom fitting 21 is configured to provide an upper large caliber portion 211 for accommodating a lower half of a check valve 91; the top receptacle 32 is capped on an opposing upper half of the check valve 91, allowing the top side of the check valve 91 to extend out of the through hole 321; a gap S is defined between the pressing surface 341 and the tubular bottom fitting 21; the check valve 91 has a collar 92; the shoulder 34 further comprises an annular bottom flange 342 located at the pressing surface 341. In installation, the collar 92 of the check valve 91 is positioned in the gap S and held down in between the annular bottom flange 342 and the topmost edge of the tubular bottom fitting 21. The annular bottom flange 342 provides an engaging force to the collar 92 of the check valve 91, enhancing the positioning stability of the check valve 91.

What is claimed is:

1. A check valve mounting structure, comprising:
    a seat plate comprising a mounting hole and at least one notch outwardly extended from the border area of said mounting hole in an intercommunication manner;
    a tubular bottom fitting mounted in said seat plate at a bottom side with a top end thereof aimed at said mounting hole, said tubular bottom fitting comprising at least one lug outwardly extended from the periphery thereof; and
    a holder block comprises a top receptacle, a shoulder extended around said top receptacle and a bottom receptacle downwardly extended from said shoulder, said top receptacle and said bottom receptacle being disposed in communication with each other, said top receptacle comprising a through hole axially extended on the center, the caliber of said bottom receptacle being larger than said top receptacle, said shoulder defining a pressing surface on a bottom side thereof within the coverage of said bottom receptacle, said bottom receptacle comprising at least one protruding portion outwardly extended from the periphery thereof, at least one first channel upwardly extended from a bottom side thereof to a predetermined distance and at least one second channel respectively and horizontally extended from a top end of one respective said first channel toward the periphery thereof; and
    wherein said bottom receptacle is downwardly inserted through said mounting hole and attached onto said tubular bottom fitting, allowing said at least one protruding portion to pass through said at least one notch; said at least one lug is respectively inserted into said at least one first channel; after insertion of said at least one lug into said at least one first channel, said holder block is rotated through a predetermined angle to move said at least one lug into said at least one second channel and to shift said at least one protruding portion partially to a bottom surface of said seat plate.

2. The check valve mounting structure as claimed in claim 1, further comprising a screw bolt, wherein said holder block further comprises a wing portion horizontally outwardly extended from said shoulder, and a locating hole cut through said wing portion; said seat plate further comprises a screw hole; said screw bolt is inserted through said locating hole and threaded into said screw hole to fixedly fasten said wing portion to said seat plate.

3. The check valve mounting structure as claimed in claim 1, wherein said he shoulder further comprises an annular bottom flange located at said pressing surface.

4. The check valve mounting structure as claimed in claim 1, wherein said tubular bottom fitting is configured to provide an upper large caliber portion.

5. The check valve mounting structure as claimed in claim 1, wherein a gap is defined between said pressing surface and the topmost edge of said tubular bottom fitting.

6. The check valve mounting structure as claimed in claim 1, wherein said at least one first channel and said second channel respectively cut through said bottom receptacle.

7. The check valve mounting structure as claimed in claim 1, wherein said bottom receptacle further comprises a recess located at a distal end of each said second channel; each said lug comprises a raised portion that is forced into engagement with one respective said recess when said at least one lug is moved to said at least one second channel.

8. The check valve mounting structure as claimed in claim 1, wherein the number of said at least one lug is 2; the number of said at least one first channel is 2; the number of said at least one second channel is 2.

9. The check valve mounting structure as claimed in claim 1, wherein the number of said at least one notch is 2; the number of said at least one protruding portion is 2.

* * * * *